United States Patent
Goulette

(10) Patent No.: US 6,563,358 B1
(45) Date of Patent: May 13, 2003

(54) TECHNIQUE FOR DISTRIBUTING COMMON PHASE CLOCK SIGNALS

(75) Inventor: Richard R. Goulette, Arnprior (CA)

(73) Assignee: Nortel Networks Limited, Quebec (CA)

( * ) Notice: Subject to any disclaimer, the term of this patent is extended or adjusted under 35 U.S.C. 154(b) by 0 days.

(21) Appl. No.: 09/665,288

(22) Filed: Sep. 20, 2000

(51) Int. Cl.[7] ............................................. G06F 1/04
(52) U.S. Cl. ........................ 327/291; 327/295; 327/298
(58) Field of Search ................................. 327/291–298

(56) References Cited

U.S. PATENT DOCUMENTS

| | | | |
|---|---|---|---|
| 3,516,065 A | 6/1970 | Bolt et al. ................... 375/257 |
| 3,619,504 A | 11/1971 | De Veer et al. ............. 375/257 |
| 4,998,262 A | 3/1991 | Wiggers ...................... 375/107 |
| 5,361,277 A | 11/1994 | Grover ........................ 375/107 |
| 5,365,205 A | 11/1994 | Wong .......................... 333/109 |
| 5,432,486 A | 7/1995 | Wong .......................... 333/109 |
| 5,528,187 A | * 6/1996 | Sato et al. ................... 327/292 |
| 5,638,402 A | 6/1997 | Osaka et al. ................ 375/257 |
| 5,666,079 A | * 9/1997 | Ma ............................... 327/276 |
| 5,990,721 A | * 11/1999 | Mellitz ........................ 327/292 |
| 6,091,739 A | 7/2000 | Simonovich et al. ....... 370/458 |
| 6,124,744 A | * 9/2000 | Oowaki ....................... 327/262 |
| 6,150,866 A | * 11/2000 | Eto et al. ..................... 327/297 |
| 6,191,632 B1 | * 2/2001 | Iwata et al. ................. 327/295 |
| 6,194,937 B1 | * 2/2001 | Minami ....................... 327/270 |

OTHER PUBLICATIONS

Grover, "A New Method For Clock Distribution", IEEE Transactions On Circuit And Systems–I: Fundamental Theory And Applications, vol. 41. No. 2, Feb. 1994.

\* cited by examiner

Primary Examiner—Timothy P. Callahan
Assistant Examiner—An T. Luu
(74) Attorney, Agent, or Firm—Hunton & Williams

(57) ABSTRACT

A technique for distributing common phase clock signals is disclosed. In one embodiment, the technique is realized by providing a forward traveling wave signal and a reverse traveling wave signal on a transmission line, wherein the forward traveling wave signal and the reverse traveling wave signal each have a common frequency and a constant relative phase. The forward traveling wave signal and the reverse traveling wave signal are each tapped off the transmission line at a plurality of different locations along the transmission line. The forward traveling wave signal and the reverse traveling wave signal that are tapped from the transmission line at each of the plurality of different locations are then combined so as to form a corresponding plurality of clock signals each having the common frequency and a common phase.

30 Claims, 5 Drawing Sheets

US 6,563,358 B1

TECHNIQUE FOR DISTRIBUTING COMMON PHASE CLOCK SIGNALS

FIELD OF THE INVENTION

The present invention relates generally to clock signal distribution and, more particularly, to a technique for distributing common phase clock signals.

BACKGROUND OF THE INVENTION

In most present day computer systems, a common clock is used by many different circuits so as to insure synchronous operation among the different circuits. However, when these different circuits are located at different distances away from a common clock source, the clock signals received at the different circuits are typically out of phase with one another. Thus, there has been much interest in finding ways to effectively distribute a clock signal from a common clock source to different circuits within a computer system such that the clock signals received at each circuit are in phase with one another.

The present method for distributing a clock signal from a common clock source to different circuits within a computer system involves the use of H-tree structures, which limit the total number of branches due to a halving of the line characteristic impedance at each branch step. Also, tapped transmission lines and H-tree structures have a limited number of branches or tap points due to the need to keep all branches impedance matched. For example, working back from a load to a source, three branches requires $2^3$ or an 8-fold reduction in line impedance at the driver location. This limits the size of the network. Further, at the lower end of the speed scale, multi-tapped transmission lines suffer from an uncertainty in pulse speed caused by large loading capacitances of connected devices (i.e., causing delays from point to point).

In view of the foregoing, it would be desirable to provide a technique for distributing a clock signal from a common clock source to different circuits within a computer system which overcomes the above-described inadequacies and shortcomings. More particularly, it would be desirable to provide a technique for distributing common phase clock signals to different circuits within a computer system in an efficient and cost effective manner.

SUMMARY OF THE INVENTION

According to the present invention, a technique for distributing common phase clock signals is provided. In one embodiment, the technique is realized by providing a forward traveling wave signal and a reverse traveling wave signal on a transmission line, wherein the forward traveling wave signal and the reverse traveling wave signal each have a common frequency and a constant relative phase. The forward traveling wave signal and the reverse traveling wave signal are each tapped off the transmission line at a plurality of different locations along the transmission line. The forward traveling wave signal and the reverse traveling wave signal that are tapped from the transmission line at each of the plurality of different locations are then combined so as to form a corresponding plurality of clock signals each having the common frequency and a common phase. The forward traveling wave signal and the reverse traveling wave signal are periodic signals.

In accordance with other aspects of the present invention, the forward traveling wave signal and the reverse traveling wave signal are beneficially provided on the transmission line by applying the forward traveling wave signal to the transmission line, and then reflecting the applied forward traveling wave signal so as to create the reverse traveling wave signal on the transmission line.

In accordance with further aspects of the present invention, the forward traveling wave signal and the reverse traveling wave signal are beneficially tapped from the transmission line via a non-contact coupler such as, for example, directional coupler.

In accordance with still further aspects of the present invention, the forward traveling wave signal and the reverse traveling wave signal that are tapped from the transmission line at each of the plurality of different locations are beneficially combined by adding the forward traveling wave signal and the reverse traveling wave signal that are tapped from the transmission line at each of the plurality of different locations. The forward traveling wave signal and the reverse traveling wave signal that are tapped from the transmission line at each of the plurality of different locations may be conditioned prior to their being added.

Alternatively, the forward traveling wave signal and the reverse traveling wave signal that are tapped from the transmission line at each of the plurality of different locations are beneficially combined by multiplying the forward traveling wave signal and the reverse traveling wave signal that are tapped from the transmission line at each of the plurality of different locations such that the corresponding plurality of clock signals each have twice the common frequency and the common phase.

Alternatively still, the forward traveling wave signal and the reverse traveling wave signal that are tapped from the transmission line at each of the plurality of different locations are beneficially combined by first summing the forward traveling wave signal and the reverse traveling wave signal that are tapped from the transmission line at each of the plurality of different locations so as to provide a plurality of summed signals. Also, the forward traveling wave signal and the reverse traveling wave signal that are tapped from the transmission line at each of the plurality of different locations are differenced so as to provide a plurality of differenced signals. Then, each of the plurality of summed signals are squared, and each of the plurality of differenced signals are squared. Then, each squared summed signal and each corresponding squared differenced signal are differenced such that the corresponding plurality of clock signals each have twice the common frequency and the common phase.

In accordance with still further aspects of the present invention, the length of the transmission line is set so as to set a delay of the plurality of clock signals with respect to the forward traveling wave signal or the reverse traveling wave signal.

In another embodiment, the technique is realized by providing a first periodic signal on a first transmission line and a second periodic signal on a second transmission line, wherein the first periodic signal and the second periodic signal each have a common frequency and a constant relative phase. The first periodic signal is tapped off the first transmission line and the second periodic signal is tapped off the second transmission line at a plurality of different corresponding locations. The first periodic signal and the second periodic signal that are tapped off the first transmission line and the second transmission line, respectively, at each of the plurality of different corresponding locations are then combined so as to form a corresponding plurality of clock signals each having a common phase. The plurality of clock signals each have a frequency that is twice the common frequency.

In accordance with other aspects of the present invention, the first periodic signal is provided on the first transmission line and the second periodic signal on the second transmission line by generating the first periodic signal and generating the second periodic signal (e.g., by signal generators). Alternatively, a common periodic signal may be generated, and the first transmission line may be terminated with a short circuit and the second transmission line may be terminated with an open circuit.

In accordance with further aspects of the present invention, the first periodic signal and the second periodic signal may be tapped off the first transmission line and the second transmission line, respectively, at each of the plurality of different corresponding locations via non-contact couplers such as, for example, capacitive or inductive couplers, or direct-contact couplers such as, for example, resistive couplers.

In accordance with still further aspects of the present invention, the first periodic signal and the second periodic signal that are tapped from the first transmission line and the second transmission line, respectively, at each of the plurality of different corresponding locations are beneficially combined by multiplying the first periodic signal and the second periodic signal that are tapped from the first transmission line and the second transmission line, respectively, at each of the plurality of different corresponding locations such that the corresponding plurality of clock signals each have twice the common frequency and the common phase.

Alternatively, the first periodic signal and the second periodic signal that are tapped from the first transmission line and the second transmission line, respectively, at each of the plurality of different corresponding locations are beneficially combined by first squaring the first periodic signal and the second periodic signal that are tapped from the first transmission line and the second transmission line, respectively, at each of the plurality of different corresponding locations. Each squared first periodic signal and each corresponding squared second periodic signal are then differenced such that the corresponding plurality of clock signals each have twice the common frequency and the common phase.

Alternatively still, the first periodic signal and the second periodic signal that are tapped from the first transmission line and the second transmission line, respectively, at each of the plurality of different corresponding locations are beneficially combined by first summing the first periodic signal and the second periodic signal that are tapped from the first transmission line and the second transmission line, respectively, at each of the plurality of different corresponding locations so as to provide a plurality of summed signals. Also, the first periodic signal and the second periodic signal that are tapped from the first transmission line and the second transmission line, respectively, at each of the plurality of different corresponding locations are differenced so as to provide a plurality of differenced signals. Then, each of the plurality of summed signals are squared, and each of the plurality of differenced signals are squared. Then, each squared summed signal and each corresponding squared differenced signal are differenced such that the corresponding plurality of clock signals each have twice the common frequency and the common phase.

In accordance with still further aspects of the present invention, a delay between the first periodic signal and the second periodic signal is set so as to set a delay of the plurality of clock signals with respect to the first periodic signal or the second periodic signal.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
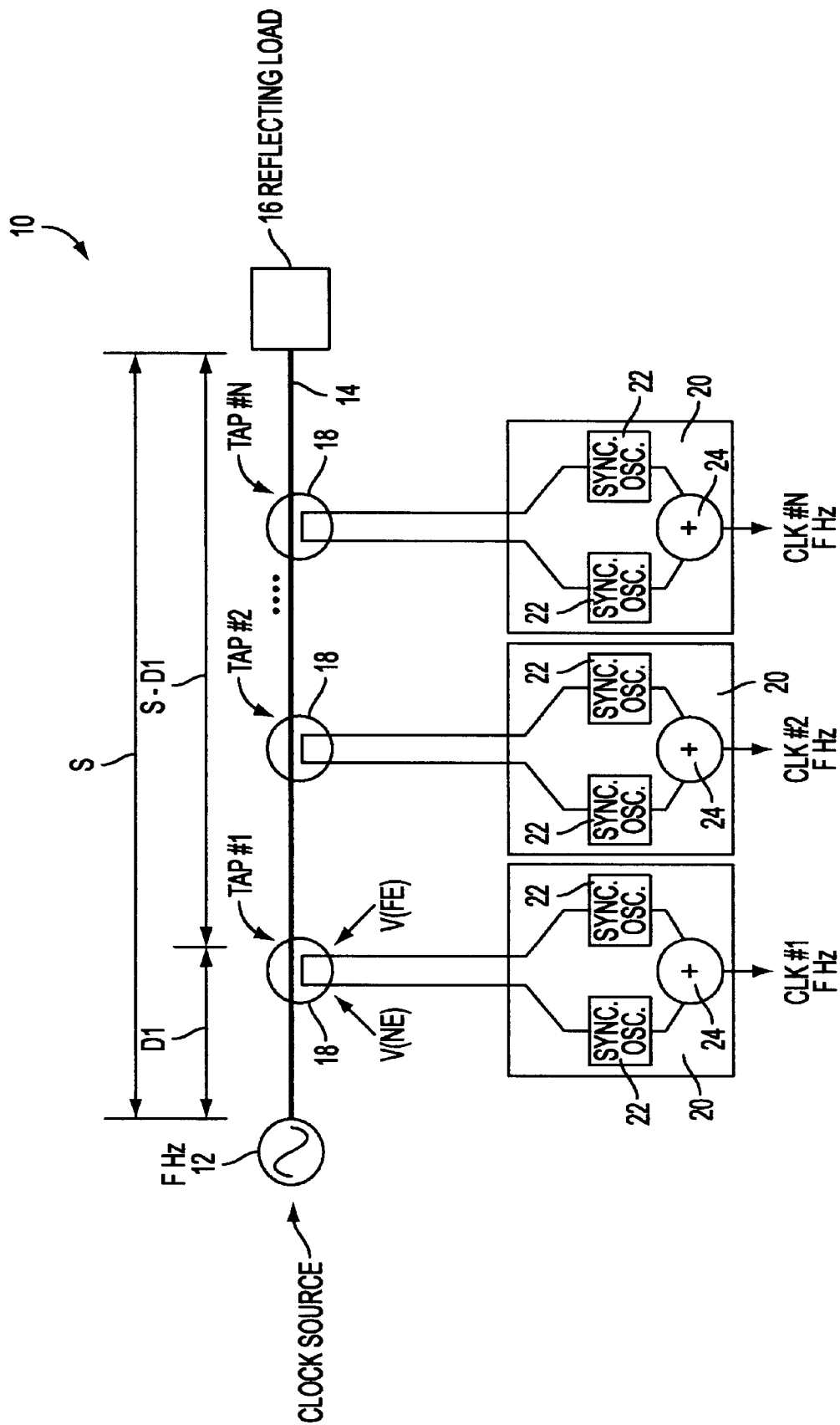
FIG. 1 is a schematic diagram of a system for distributing a common phase clock signal from a common clock source to a plurality of different circuit destinations in accordance with the present invention.

Referring to FIG. 1, there is shown a system 10 for distributing a common phase clock signal to a plurality of different circuit destinations in accordance with the present invention. That is, the system 10 allows for the distribution of a clock signal from a common clock source to a plurality of different circuit destinations, while maintaining constant phase of the clock signals at all of the different circuit destinations. The system 10 comprises a sinusoidal clock source 12 for generating a sinusoidal signal having a frequency, F Hz. The system 10 also comprises a transmission line 14 having a phase constant, $\beta$, which is dependent upon the dielectric constant of the transmission line 14. That is, the phase constant, $\beta$, is given by:

$$\beta = 2/\lambda,$$

wherein $\lambda$ is the wavelength of the signal propagating along the transmission line 14. The wavelength, $\lambda$, is given by:

$$\lambda = v/f,$$

wherein f is the frequency of the signal propagating along the transmission line 14, and v is the velocity of the signal propagating along the transmission line 14. The velocity, v, is given by:

$$v = c_0 \sqrt{\in_T},$$

wherein $c_0$ is the speed of light and $\in_T$ is the dielectric constant of the transmission line 14.

The system 10 further comprises a reflecting load 16 connected to the transmission line 14 at a distance, S, from the sinusoidal clock source 12. The reflecting load 16 is a mismatched load and may be, for example, an open circuit. The presence of the reflecting load 16 causes both a forward traveling wave and a reverse traveling wave to be created on the transmission line 14 from the sinusoidal signal generated by the sinusoidal clock source 12.

The system 10 further comprises a plurality of directional couplers 18 for tapping off the transmission line 14. Each directional coupler 18 is positioned along the transmission line 14 at a particular distance from the sinusoidal clock source 12. That is, a first directional coupler 18 is positioned along the transmission line 14 at a distance, D1, from the sinusoidal clock source 12, a second directional coupler 18 is positioned along the transmission line 14 at a distance, D2, from the sinusoidal clock source 12, and so on.

Each directional coupler 18 has a near-end output for providing a near-end voltage signal, V(NE), tapped off the transmission line 14, and a far-end output for providing a far-end voltage signal, V(FE), tapped off the transmission line 14. That is, the near-end voltage signal, V(NE), represents the forward traveling wave created by the reflecting load 16 from the sinusoidal signal generated by the sinusoidal clock source 12, and the far-end voltage signal, V(FE), represents the reverse traveling wave created by the reflecting load 16 from the sinusoidal signal generated by the sinusoidal clock source 12.

At this point it should be noted that it is within the scope of the present invention that the directional couplers 18 may beneficially be embedded into a printed circuit board substrate.

The system 10 further comprises a plurality of combiner circuits 20 each comprising a pair of synchronous oscillators 22 and an adder circuit 24. The near-end voltage signal, V(NE), and the far-end voltage signal, V(FE), that are tapped off the transmission line 14 are typically attenuated and pick up noise while propagating along the transmission line 14. Thus, these signals typically need to be processed so as to restore the quality of the original signals. This is accomplished by the pair of synchronous oscillators 22, which coherently track the phase of and amplify signals presented at their inputs. As an option, the output of the synchronous oscillators 22 may be in sinusoidal form, or may be converted to a square wave format, depending upon the needs of the circuit devices to be clocked. The synchronous oscillators 22 may also be used as clock repeaters to apply clock signals to yet another clock distribution bus.

The outputs of each pair of synchronous oscillators 22 are added together by the adder circuit 24 resulting in an output clock signal, CLK#N, having the same frequency, F Hz, as the sinusoidal signal generated by the sinusoidal clock source 12. Further, the output clock signals, CLK#N, all have the same phase relative to the phase of the sinusoidal signal generated by the sinusoidal clock source 12. That is, the phase difference of the first output clock signal, CLK#1, relative to the phase of the sinusoidal signal generated by the sinusoidal clock source 12 is given by:

$$\text{phase } \Delta \text{ of CLK\#1} = \beta(D1 + (S + S - D1))/2 = \beta 2S$$

Similarly, the phase difference of the second output clock signal, CLK#2, relative to the phase of the sinusoidal signal generated by the sinusoidal clock source 12 is given by:

$$\text{phase } \Delta \text{ of CLK\#2} = \beta(D2 + (S + S - D2))/2 = \beta 2S$$

And so on, thus all output clock signals have the same frequency, F Hz, as well as the same phase relative to the phase of the sinusoidal signal generated by the sinusoidal clock source 12.

At this point it should be noted that the delay of all the output clock signals with respect to the sinusoidal signal generated by the sinusoidal clock source 12 can be adjusted by changing the total distance, S, between the sinusoidal clock source 12 and the reflecting load 14, in combination with the distance, T, from the tap point to the load. That is, there is a delay associated with the distance, T, from the each tap point to each corresponding load. Thus, the constant phase relative to the sinusoidal signal generated by the sinusoidal clock source 12 may be designed to be a specific value by adjusting the length, S, and characteristics of the transmission line 14, as well as the distance, T, from the each tap point to each corresponding load. The characteristics (e.g., input/output impedance) of the various components in the system 10 also have an obvious effect.

It should also be noted that the combiner circuits 20 may be replaced with multiplier circuits, or may include adders, subtractors, squaring circuits, and differencers, to achieve similar results as obtained above, as described in detail below. The use of addition as a signal combiner produces clock signals of constant phase at each tap. However, the signal amplitude can vary from tap to tap and nulls occur whenever $(2D-S)/1 = m/2$, where m is an odd integer. Hence, the use of the addition process is typically limited to clock distribution applications where tap locations can be judiciously selected to avoid nulls. The use of multiplication as a signal combiner does not have a similar limitation and results in equal clock signal amplitude and phase at each tap.

Figure 2:
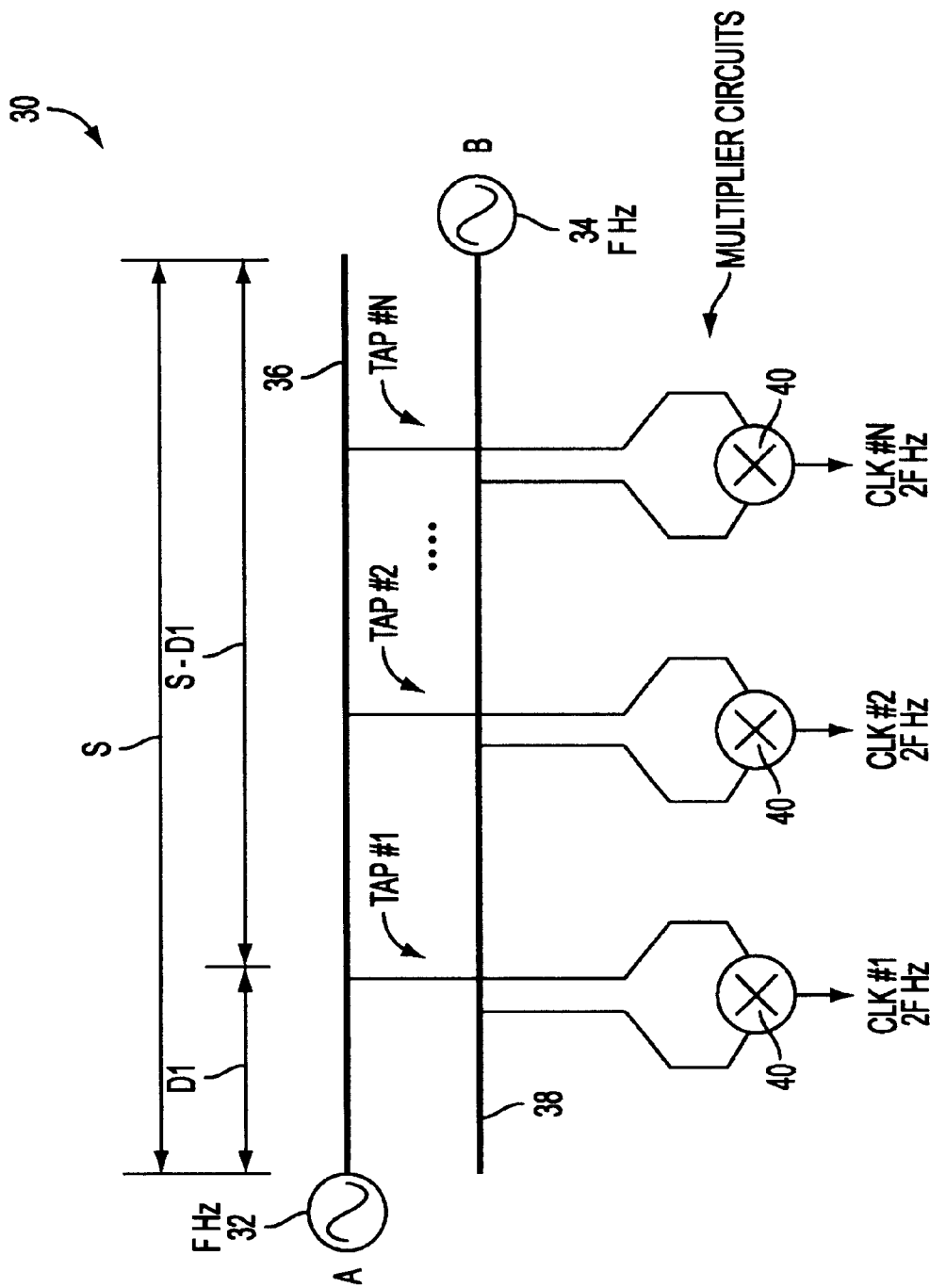
FIG. 2 is a schematic diagram of an alternate embodiment of a system for distributing a common phase clock signal to a plurality of different circuit destinations in accordance with the present invention.

Referring to FIG. 2, there is shown an alternate embodiment of a system 30 for distributing a common phase clock signal to a plurality of different circuit destinations in accordance with the present invention. The system 30 comprises a first sinusoidal clock source (A) 32 for generating a first sinusoidal signal having a frequency, F Hz, and a second sinusoidal clock source (B) 34 for generating a second sinusoidal signal also having a frequency, F Hz. The system 30 also comprises a first transmission line 36 having a first phase constant, $\beta 1$, which is dependent upon the dielectric constant of the first transmission line 36, and a second transmission line 38 having a second phase constant, $\beta 2$, which is dependent upon the dielectric constant of the second transmission line 38. Thus, the first sinusoidal signal generated by the first sinusoidal clock source (A) 32 and the second sinusoidal signal generated by the second sinusoidal clock source (B) 34 each propagate along the first transmission line 36 and the second transmission line 38, respectively, at a common frequency, F Hz. However, in accordance with the present invention, the phase of the first sinusoidal signal need not be the same as the phase of the second sinusoidal signal, but the relative phase between the first sinusoidal signal and the second sinusoidal signal should remain constant. The first transmission line 36 and the second transmission line 38 are both of length, S, and the phase constants, $\beta 1$ and $\beta 2$, may be calculated in a manner similar to that shown above.

At this point it should be noted that the first transmission line 36 and the second transmission line 38 are typically matched or terminated such that there are no signal reflections on either the first transmission line 36 or the second transmission line 38.

The first sinusoidal signal and the second sinusoidal signal are tapped off the first transmission line 36 and the second transmission line 38, respectively, in pairs at particular points along the first transmission line 36 and the second transmission line 38. That is, the first sinusoidal signal is first tapped off the first transmission line 36 at a distance, D1, from the first sinusoidal clock source (A) 32, while the second sinusoidal signal is first tapped off the second transmission line 38 at a distance, S-D1, from the second sinusoidal clock source (B) 34. The first sinusoidal signal is next tapped off the first transmission line 36 at a distance, D2, from the first sinusoidal clock source (A) 32, while the second sinusoidal signal is next tapped off the second transmission line 38 at a distance, S-D2, from the second sinusoidal clock source (B) 34, and so on.

At this point it should be noted that the first sinusoidal signal and the second sinusoidal signal may be tapped off the first transmission line 36 and the second transmission line 38, respectively, by either non-contact taps such as, for example, capacitive taps or inductive taps, or direct contact taps such as, for example, resistive taps. However, non-contact taps are preferable as they are less lossy and thereby allow more taps to be made along the transmission lines 36 and 38. Also, because there are less losses associated with non-contact taps, their use is particularly effective ove range of clock frequencies from 10 MHz to over 1

It should also be noted that it is within the scope of the present invention that either the non-contact taps or the direct-contact taps may beneficially be embedded into a printed circuit board substrate.

The system 30 further comprises a plurality of multiplier circuits 40 for multiplying together the pairs of sinusoidal signals tapped off the first transmission line 36 and the second transmission line 38. The output of each multiplier circuit 40 is an output clock signal, CLK#N, having a frequency, 2F Hz, that is twice the frequency, F Hz, of the sinusoidal signals generated by the first and second sinusoidal clock sources 32 and 34. Further, the output clock signals, CLK#N, are all of the same phase. To illustrate, for any two phasors V1 and V2, the multiplication of these phasors is given by:

$$V1\angle\theta1 \times V2\angle\theta2 = V1V2\angle\theta1+\theta1$$

Thus, for CLK#1, where the first sinusoidal signal generated by the first sinusoidal clock source (A) 32 and the second sinusoidal signal generated by the second sinusoidal clock source (B) 34 each propagate along the first transmission line 36 and the second transmission line 38, respectively, at a common frequency, F Hz, and where the phase constants, $\beta1=\beta2=\beta$, the output clock signal, CLK#1, is given by:

$$CLK\#1 = A\angle\beta D \times B\angle\beta(S-D) = AB\angle\beta S$$

In other words, the product of the two sinusoidal signals at any given tap results in a signal of constant phase with a frequency, 2F Hz, that is twice the frequency, F Hz, of the sinusoidal signals generated by the first and second sinusoidal clock sources 32 and 34.

Figure 3:
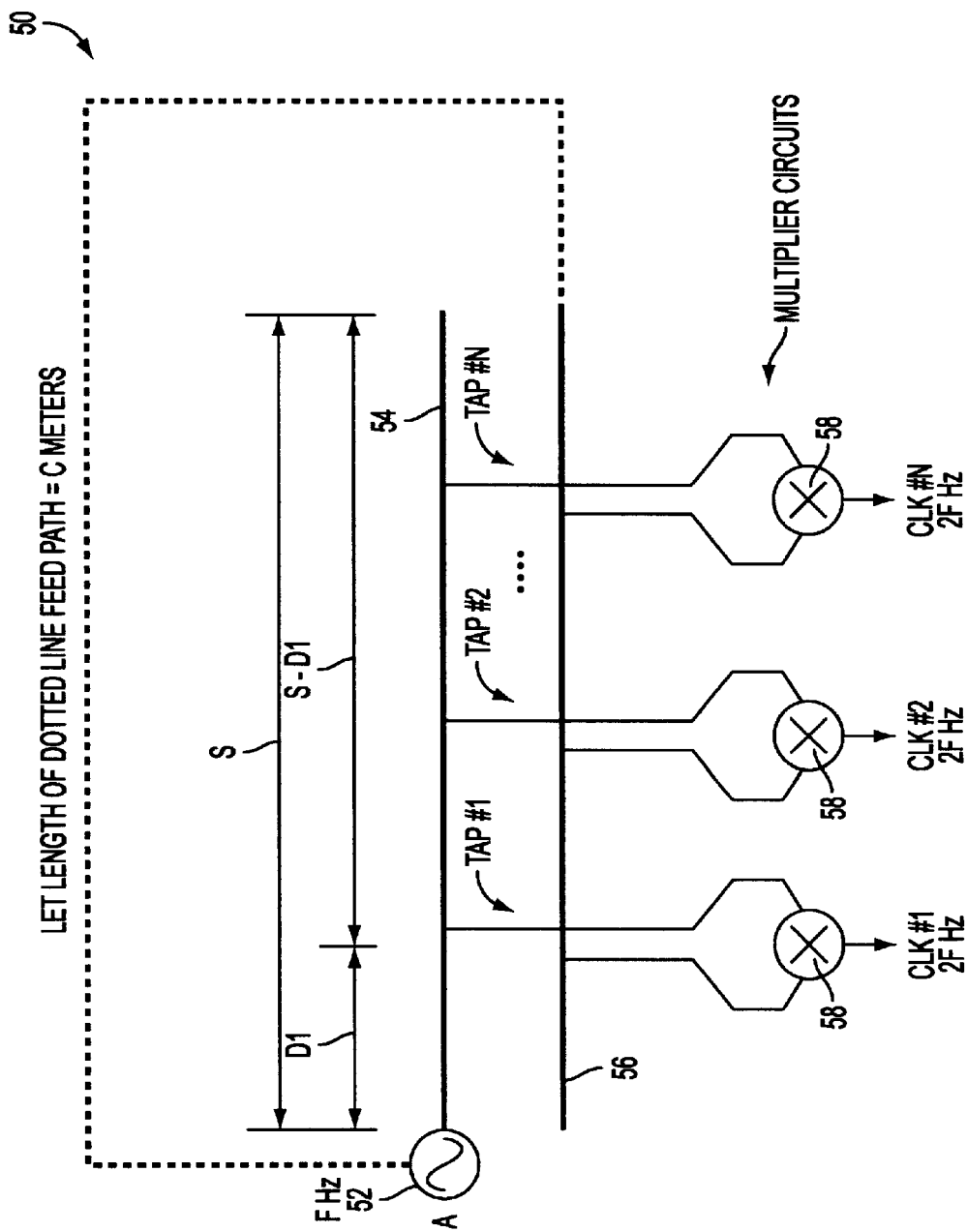
FIG. 3 is a schematic diagram of another alternate embodiment of a system for distributing a common phase clock signal to a plurality of different circuit destinations in accordance with the present invention.

Referring to FIG. 3, there is shown another alternate embodiment of a system 50 for distributing a common phase clock signal to a plurality of different circuit destinations in accordance with the present invention. The system 50 is similar to the system 30 shown in FIG. 2 except that only one sinusoidal clock source (A) 52 is used to generate both a first sinusoidal signal having a frequency, F Hz, on a first transmission line 54 having a first phase constant, $\beta1$, and a second sinusoidal signal having a frequency, F Hz, on a second transmission line 56 having a second phase constant, $\beta2$. Also similar to above, the first phase constant, $\beta1$, is dependent upon the dielectric constant of the first transmission line 54, and the second phase constant, $\beta2$, is dependent upon the dielectric constant of the second transmission line 56. Thus, the first sinusoidal signal propagates along the first transmission line 54 and the second sinusoidal signal propagates along the second transmission line 56, both at a common frequency, F Hz. However, in accordance with the present invention, the phase of the first sinusoidal signal need not be the same as the phase of the second sinusoidal signal, but the relative phase between the first sinusoidal signal and the second sinusoidal signal should remain constant.

At this point it should be noted that the first transmission line 54 and the second transmission line 56 are typically matched or terminated such that there are no signal reflections on either the first transmission line 54 or the second transmission line 56.

As shown in FIG. 3, the second transmission line 56 includes a portion of length, C, in between the sinusoidal clock source (A) 52 and the portions of length, S, of both the first transmission line 54 and the second transmission line 56. As also shown in FIG. 3, system 50 further comprises a plurality of multiplier circuits 58 for multiplying together the pairs of sinusoidal signals tapped off the first transmission line 54 and the second transmission line 56. The output of each multiplier circuit 58 is an output clock signal, CLK#N, having a frequency, 2F Hz, that is twice the frequency, F Hz, of the first and second sinusoidal signals. Further, the output clock signals, CLK#N, are all of the same phase. To illustrate, for CLK#1, where the first sinusoidal signal propagates along the first transmission line 54 and the second sinusoidal signal propagates along the second transmission line 56, both at a common frequency, F Hz, and where the phase constants, $\beta1=\beta2=\beta$, the output clock signal, CLK#1, is given by:

$$CLK\#1 = A\angle\beta D \times A\angle\beta(C+S-D) = A^2\angle\beta(C+S)$$

In other words, the product of the two sinusoidal signals at any given tap results in a signal of constant phase with a frequency, 2F Hz, that is twice the frequency, F Hz, of the first and second sinusoidal signals.

At this point it should be noted that the first sinusoidal signal and the second sinusoidal signal may be tapped off the first transmission line 54 and the second transmission line 56, respectively, by either non-contact taps such as, for example, capacitive taps or inductive taps, or direct contact taps such as, for example, resistive taps. However, non-contact taps are preferable as they are less lossy and thereby allow more taps to be made along the transmission lines 54 and 56. Also, because there are less losses associated with non-contact taps, their use is particularly effective over a wide range of clock frequencies from 10 MHz to over 10 GHz.

It should also be noted that it is within the scope of the present invention that either the non-contact taps or the direct-contact taps may beneficially be embedded into a printed circuit board substrate.

Figure 4:
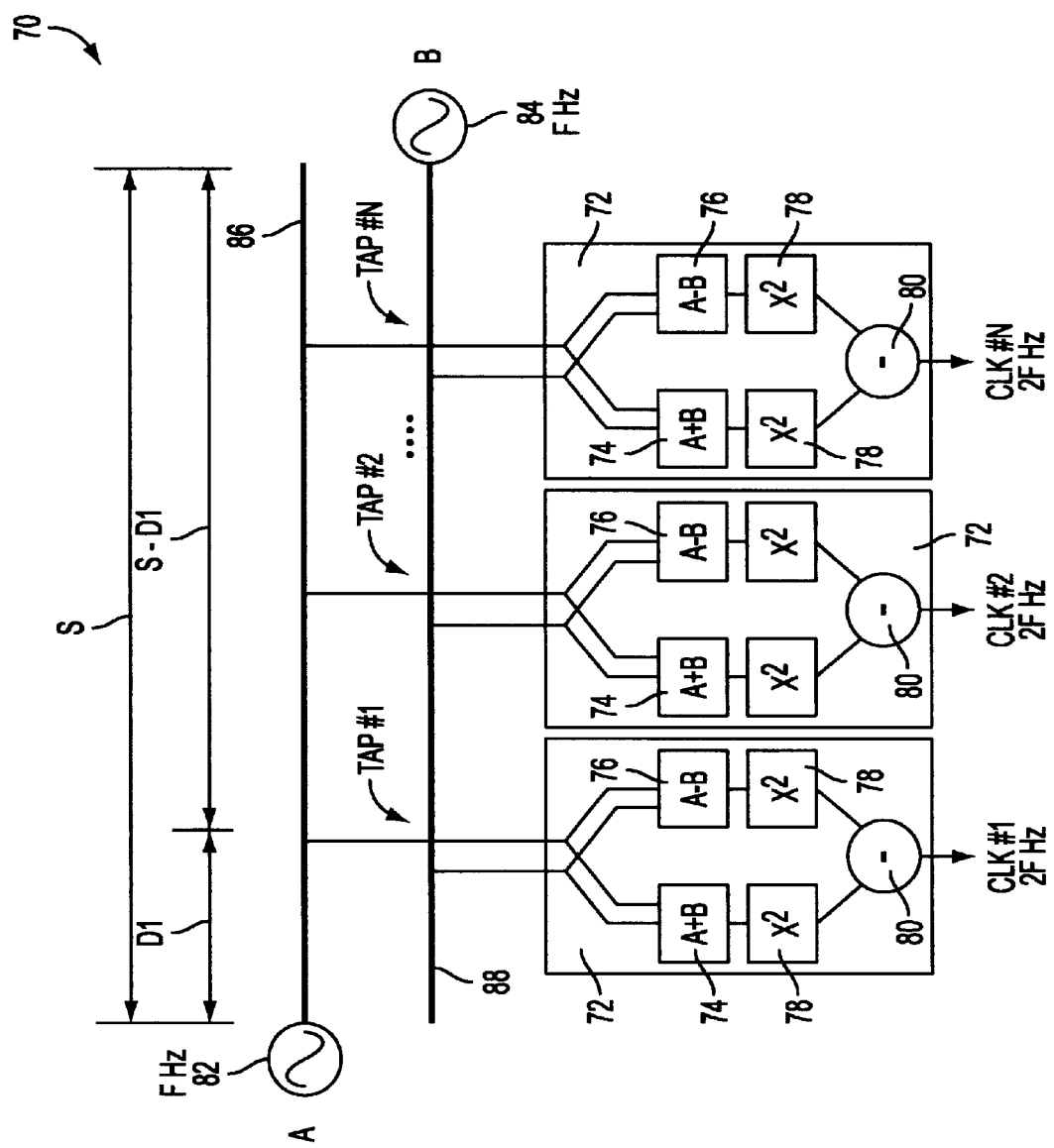
FIG. 4 is a schematic diagram of still another alternate embodiment of a system for distributing a common phase clock signal to a plurality of different circuit destinations in accordance with the present invention.

Referring to FIG. 4, there is shown another alternate embodiment of a system 70 for distributing a common phase clock signal to a plurality of different circuit destinations in accordance with the present invention. The system 70 is similar to the system 30 shown in FIG. 2 except that the multiplier circuits 40 are replaced by combiner circuits 72 each comprising an adder 74, a subtractor 76, a pair of squaring circuits 78, and a differencer 80. While the combiner circuits 72 achieve the same multiplication function as achieved by the multiplier circuits 40, the combiner circuits 72 are typically easier to implement in semiconductor circuitry.

As with the system 30 shown in FIG. 2, the system 70 also comprises a first sinusoidal clock source (A) 82 for generating a first sinusoidal signal having a frequency, F Hz, and a second sinusoidal clock source (B) 84 for generating a second sinusoidal signal also having a frequency, F Hz. The system 70 also comprises a first transmission line 86 having a first phase constant, $\beta 1$, which is dependent upon the dielectric constant of the first transmission line 86, and a second transmission line 88 having a second phase constant, $\beta 2$, which is dependent upon the dielectric constant of the second transmission line 88. Thus, the first sinusoidal signal generated by the first sinusoidal clock source (A) 82 and the second sinusoidal signal generated by the second sinusoidal clock source (B) 84 each propagate along the first transmission line 86 and the second transmission line 88, respectively, at a common frequency, F Hz. However, in accordance with the present invention, the phase of the first sinusoidal signal need not be the same as the phase of the second sinusoidal signal, but the relative phase between the first sinusoidal signal and the second sinusoidal signal should remain constant. The first transmission line 86 and the second transmission line 88 are both of length, S, and the phase constants, $\beta 1$ and $\beta 2$, may be calculated in a manner similar to that shown above.

At this point it should be noted that the first transmission line 86 and the second transmission line 88 are typically matched or terminated such that there are no signal reflections on either the first transmission line 86 or the second transmission line 88.

As mentioned above, the adder 74, the subtractor 76, the pair of squaring circuits 78, and the differencer 80 of each combiner circuit 72 function as a multiplier. Thus, the plurality of combiner circuits 72 act to multiply the pairs of sinusoidal signals tapped off the first transmission line 86 and the second transmission line 88. The output of each combiner circuit 72 is an output clock signal, CLK#N, having a frequency, 2F Hz, that is twice the frequency, F Hz, of the first and second sinusoidal signals. Further, the output clock signals, CLK#N, are all of the same phase. To illustrate, for CLK#1, where the first sinusoidal signal propagates along the first transmission line 86 and the second sinusoidal signal propagates along the second transmission line 88, both at a common frequency, F Hz, and where the phase constants, $\beta 1=\beta 2=\beta$, the output clock signal, CLK#1, is given by:

$$CLK\#1 = A\angle \beta D \times B\angle \beta(S-D) = AB\angle \beta S$$

In other words, the product of the two sinusoidal signals at any given tap results in a signal of constant phase with a frequency, 2F Hz, that is twice the frequency, F Hz, of the first and second sinusoidal signals.

At this point it should be noted that the first sinusoidal signal and the second sinusoidal signal may be tapped off the first transmission line 86 and the second transmission line 88, respectively, by either non-contact taps such as, for example, capacitive taps or inductive taps, or direct contact taps such as, for example, resistive taps. However, non-contact taps are preferable as they are less lossy and thereby allow more taps to be made along the transmission lines 86 and 88. Also, because there are less losses associated with non-contact taps, their use is particularly effective over a wide range of clock frequencies from 10 MHz to over 10 GHz.

It should also be noted that it is within the scope of the present invention that either the non-contact taps or the direct-contact taps may beneficially be embedded into a printed circuit board substrate.

It should further be noted that the delay of all of the output clock signals with respect to the first clock source (A) 82 (or the second clock source (B) 84) can be adjusted by changing the delay between the first clock source (A) 82 and the second clock source (B) 84, while the frequency of the second sinusoidal remains identical to that of the first sinusoidal signal. Such a delay can be produced by the use of phase shift circuits, delay lines, or digital delay circuits which regenerate the clock frequency, and could be manually adjusted or automatically adjusted under feedback control to optimize the timing of the clock signals with respect to associated data signals arriving at clocked data receiver circuits.

Figure 5:
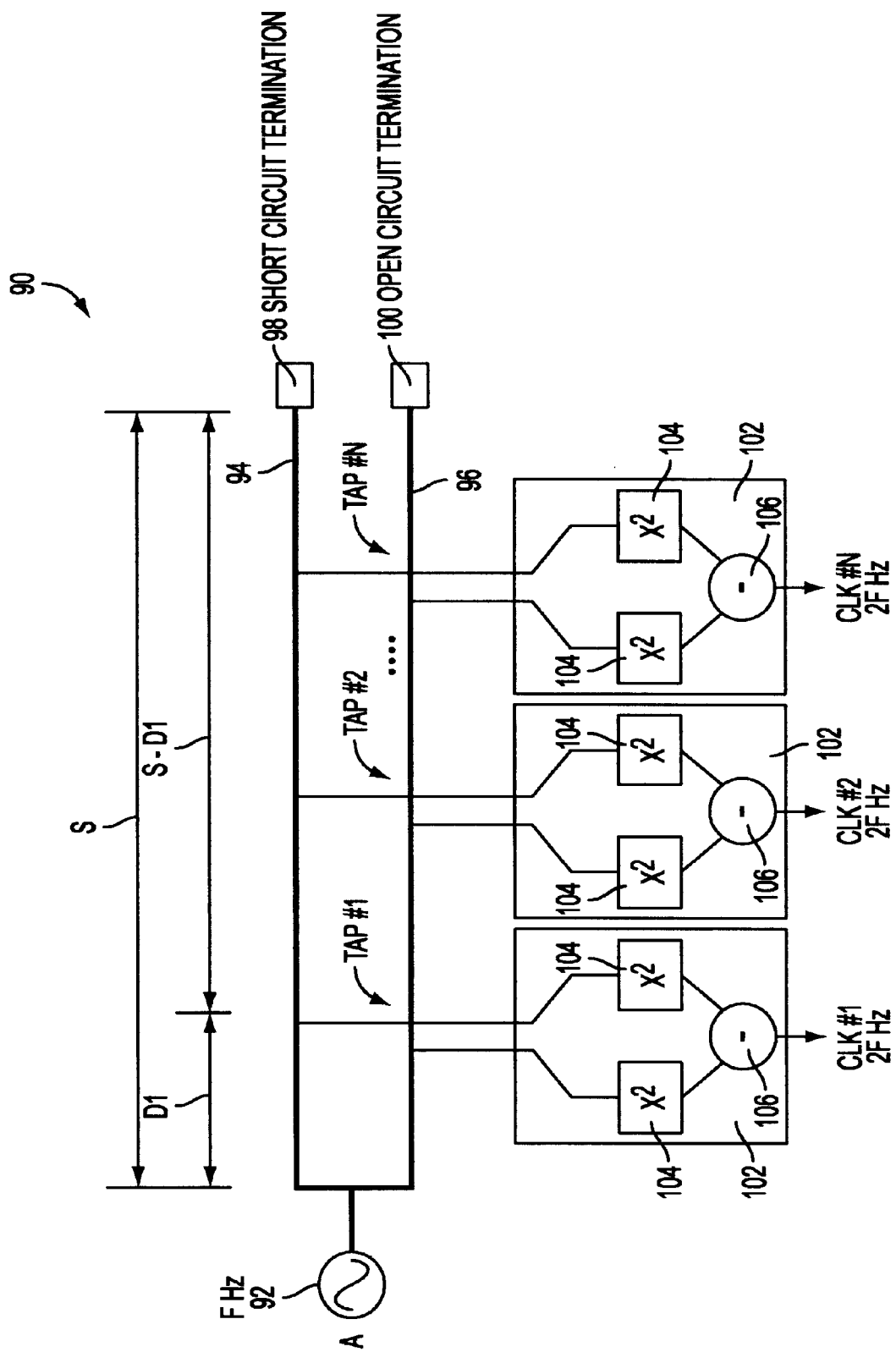
FIG. 5 is a schematic diagram of still another alternate embodiment of a system for distributing a common phase clock signal to a plurality of different circuit destinations in accordance with the present invention.

Referring to FIG. 5, there is shown another alternate embodiment of a system 90 for distributing a common phase clock signal to a plurality of different circuit destinations in accordance with the present invention. The system 90 is similar to the system 30 shown in FIG. 2 except that only one sinusoidal clock source (A) 92 is used to generate both a first sinusoidal signal having a frequency, F Hz, on a first transmission line 94 having a first phase constant, $\beta 1$, and a second sinusoidal signal having a frequency, F Hz, on a second transmission line 96 having a second phase constant, $\beta 2$. The first transmission line 94 comprises a short circuit termination 98 located at a distance, S, from the sinusoidal clock source (A) 92, and the second transmission line 96 comprises an open circuit termination 100 located at a distance, S, from the sinusoidal clock source (A) 92. The short circuit termination 98 of first transmission line 94 and the open circuit termination 100 of the second transmission line 96 effectively create the sum and difference products of the combiner circuits 72 of FIG. 4 by standing wave action. Thus, the system 90 also comprises a plurality of combiner circuits 102 with each only comprising a pair of squaring circuits 104 and a differencer 106. Also similar to above, the first phase constant, $\beta 1$, is dependent upon the dielectric constant of the first transmission line 94, and the second phase constant, $\beta 2$, is dependent upon the dielectric constant of the second transmission line 96. Thus, the first sinusoidal signal propagates along the first transmission line 94 and the second sinusoidal signal propagates along the second transmission line 56, both at a common frequency, F Hz. However, in accordance with the present invention, the phase of the first sinusoidal signal need not be the same as the phase of the second sinusoidal signal, but the relative phase between the first sinusoidal signal and the second sinusoidal signal should remain constant.

The combiner circuits 102 act to multiply together the pairs of sinusoidal signals tapped off the first transmission line 94 and the second transmission line 96. The output of each combiner circuit 102 is an output clock signal, CLK#N, having a frequency, 2F Hz, that is twice the frequency, F Hz, of the first and second sinusoidal signals. Further, the output clock signals, CLK#N, are all of the same phase. To illustrate, for CLK#1, where the first sinusoidal signal propagates along the first transmission line 94 and the second sinusoidal signal propagates along the second transmission line 96, both at a common frequency, F Hz, and where the phase constants, $\beta 1=\beta 2=\beta$, the output clock signal, CLK#1, is given by:

$$CLK\#1 = A\angle \beta D \times A\angle \beta(S+S-D) = A^2\angle \beta(S+S)$$

In other words, the product of the two sinusoidal signals at any given tap results in a signal of constant phase with a frequency, 2F Hz, that is twice the frequency, F Hz, of the first and second sinusoidal signals.

At this point it should be noted that the first sinusoidal signal and the second sinusoidal signal may be tapped off the first transmission line 94 and the second transmission line 96, respectively, by either non-contact taps such as, for example, capacitive taps or inductive taps, or direct contact taps such as, for example, resistive taps. However, non-contact taps are preferable as they are less lossy and thereby allow more taps to be made along the transmission lines 94 and 96. Also, because there are less losses associated with non-contact taps, their use is particularly effective over a wide range of clock frequencies from 10 MHz to over 10 GHz.

It should also be noted that it is within the scope of the present invention that either the non-contact taps or the direct-contact taps may beneficially be embedded into a printed circuit board substrate.

All of the embodiments described above have a common property in that phase shifts of more than 360 degrees (or $2\pi$ radians) are ambiguous, so that the absolute delay between a given clock tap and the clock generator or source is indeterminate unless other information is available to the receiver of the clock tap signal. One example of such information is the design knowledge that the given clock tap is in the physical system clock wiring domain corresponding to n×360 degrees or (n+1)×360 degrees (or $n2\pi$ to $(n+1)2\pi$ radians), where n is an integer. This allows phase shifts of over 360 degrees to be unambiguously established, and delays to be computed, or the absolute time to be established if the absolute time of the clock generator or source is known.

Alternatively, a second clock signal may be provided which is an integral sub-multiple of the main clock and routed along with the main clock, allowing the 360 degree limit to be extended to longer clock routing distances corresponding to one wavelength of the second, lower frequency clock. Further, this second clock frequency may be superimposed on the various clock distribution transmission lines described in all of the above embodiments, and recovered separately through the use of tuned circuits, particularly by the use of coherent synchronous oscillators separately tuned to the two separate frequencies. This has the added benefit that the wiring propagation delay would be more closely matched for both frequencies, since both clock frequencies share a common transmission line path.

In other applications, where two separate clock frequencies are required, a second clock frequency, not necessarily harmonically related to the first clock frequency, may be superimposed on the various clock distribution transmission lines described in all of the above embodiments, and recovered separately through the use of tuned circuits, particularly by the use of coherent synchronous oscillators separately tuned to the two separate frequencies. This has the added benefit that the wiring propagation delay would be more closely matched for both frequencies, since both clock frequencies share a common transmission line path.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for distributing common phase clock signals, the method comprising the step of:

providing a forward traveling wave sinusoidal signal and a reverse traveling wave sinusoidal signal on a transmission line, the forward traveling wave sinusoidal signal and the reverse traveling wave sinusoidal signal each having a common frequency and a constant relative phase;

tapping the forward traveling wave sinusoidal signal and the reverse traveling wave sinusoidal signal off the transmission line at a plurality of different locations along the transmission line by non-contact coupling the forward traveling wave sinusoidal signal and the reverse traveling wave sinusoidal signal from the transmission line;

reconditioning the forward traveling wave sinusoidal signal and the reverse traveling wave sinusoidal signal tapped from the transmission line at each of the plurality of different locations; and adding the reconditioned forward traveling wave sinusoidal signal and the reconditioned reverse traveling wave sinusoidal signal tapped from the transmission line at each of the plurality of different locations so as to form a corresponding plurality of clock signals each having the common frequency and a common phase.

2. The method as defined in claim 1, wherein the forward traveling wave sinusoidal signal and the reverse traveling wave sinusoidal signal are periodic sinusoidal signals.

3. The method as defined in claim 1, wherein the step of providing comprises the steps of:

applying the forward traveling wave sinusoidal signal to the transmission line; and reflecting the applied forward traveling wave sinusoidal signal so as to create the reverse traveling wave sinusoidal signal on the transmission line.

4. The method as defined in claim 1, further comprising the step of:

setting the length of the transmission line so as to set a delay of the plurality of clock signals with respect to the forward traveling wave sinusoidal signal or the reverse traveling wave sinusoidal signal.

5. An apparatus for distributing common phase clock signals, the apparatus comprising:

a transmission line;

a signal generator connected to the transmission line for applying a forward traveling wave sinusoidal signal thereto;

a reflecting load connected to the transmission line for reflecting the applied forward traveling wave sinusoidal signal so as to create a reverse traveling wave sinusoidal signal on the transmission line, the forward traveling wave sinusoidal signal and the reverse traveling wave sinusoidal signal having a common frequency and a constant relative phase;

a plurality of taps disposed proximate to the transmission line for tapping the forward traveling wave sinusoidal signal and the reverse traveling wave sinusoidal signal off the transmission line at a corresponding plurality of different locations along the transmission line, wherein at least one of the plurality of taps is a non-contact coupler;

a synchronous oscillator for reconditioning the forward traveling wave sinusoidal signal and the reverse traveling wave sinusoidal signal tapped from the transmission line at each of the plurality of different locations; and a plurality of adders for adding the reconditioned forward traveling wave sinusoidal signal and the reconditioned reverse traveling wave sinusoidal signal tapped from the transmission line at each of the plurality of different locations so as to form a corresponding plurality of clock signals each having the common frequency and a common phase.

6. The apparatus as defined in claim 5, wherein the forward traveling wave sinusoidal signal and the reverse traveling wave sinusoidal signal are periodic sinusoidal signals.

7. The apparatus as defined in claim 5, wherein the reflecting load is an open circuit.

8. The apparatus as defined in claim 5, wherein the reflecting load is a short circuit.

9. The apparatus as defined in claim 5, wherein the length of the transmission line is set so as to set a delay of the plurality of clock signals with respect to the forward traveling wave sinusoidal signal or the reverse traveling wave sinusoidal signal.

10. An apparatus for distributing common phase clock signals, the apparatus comprising:

a first signal generator for generating a first sinusoidal signal;

a second signal generator for generating a second sinusoidal signal, the first sinusoidal signal and the second sinusoidal signal each having a common frequency and a constant relative phase;

a first transmission line for carrying the first sinusoidal signal, the first transmission line being terminated with a short circuit;

a second transmission line for carrying the second sinusoidal signal, the second transmission line being terminated with an open circuit;

a plurality of taps for tapping the first sinusoidal signal off the first transmission line and the second sinusoidal signal off the second transmission line at a plurality of corresponding locations; and a plurality of combiners for combining the first sinusoidal signal and the second sinusoidal signal tapped off the first transmission line and the second transmission line, respectively, at each of the plurality of corresponding locations so as to form a corresponding plurality of clock signals each having a common phase.

11. The apparatus as defined in claim 10, wherein the plurality of clock signals each have a frequency that is twice the common frequency.

12. The apparatus as defined in claim 10, wherein the first signal generator and the second signal generator are a common signal generator for generating a common signal, and wherein the first sinusoidal signal and the second sinusoidal signal are provided from the common signal.

13. The apparatus as defined in claim 10, wherein at least one of the plurality of taps is a direct-contact coupler.

14. The apparatus as defined in claim 10, wherein a delay between the first sinusoidal signal and the second sinusoidal signal is set so as to set a delay of the plurality of clock signals with respect to the first sinusoidal signal or the second sinusoidal signal.

15. A method for distributing common phase clock signals, the method comprising the step of:

providing a first sinusoidal signal on a first transmission line and a second sinusoidal signal on a second transmission line, the first sinusoidal signal and the second sinusoidal signal each having a common frequency and a constant relative phase, the first transmission line being terminated with a short circuit, the second transmission line being terminated with an open circuit;

tapping the first sinusoidal signal off the first transmission line and the second sinusoidal signal off the second transmission line at a plurality of corresponding locations by non-contact coupling the first sinusoidal signal from the first transmission line and non-contact coupling the second sinusoidal signal from the second transmission line; and, combining the first sinusoidal signal and the second sinusoidal signal tapped off the first transmission line and the second transmission line, respectively, at each of the plurality of corresponding locations so as to form a corresponding plurality of clock signals each having a common phase.

16. The method as defined in claim 15, wherein the plurality of clock signals each have a frequency that is twice the common frequency.

17. The method as defined in claim 15, wherein the step of providing comprises the steps of:

generating the first sinusoidal signal; and generating the second sinusoidal signal.

18. The method as defined in claim 15, wherein the first sinusoidal signal and the second sinusoidal signal are provided from a common signal.

19. The method as defined in claim 15, wherein the step of tapping comprises the step of:

direct-contact coupling the first sinusoidal signal from the first transmission line; and direct-contact coupling the second sinusoidal signal from the second transmission line.

20. The method as defined in claim 15, further comprising the step of:

setting a delay between the first sinusoidal signal and the second sinusoidal signal so as to set a delay of the plurality of clock signals with respect to the first sinusoidal signal or the second sinusoidal signal.

21. A method for distributing common phase clock signals, the method comprising the step of:

providing a forward traveling wave sinusoidal signal and a reverse traveling wave sinusoidal signal on a transmission line, the forward traveling wave sinusoidal signal and the reverse traveling wave sinusoidal signal each having a common frequency and a constant relative phase;

tapping the forward traveling wave sinusoidal signal and the reverse traveling wave sinusoidal signal off the transmission line at a plurality of different locations along the transmission line by non-contact coupling the forward traveling wave sinusoidal signal and the reverse traveling wave sinusoidal signal from the transmission line;

summing the forward traveling wave sinusoidal signal and the reverse traveling wave sinusoidal signal tapped from the transmission line at each of the plurality of different locations so as to provide a plurality of summed signals;

differencing the forward traveling wave sinusoidal signal and the reverse traveling wave sinusoidal signal tapped from the transmission line at each of the plurality of different locations so as to provide a plurality of differenced signals;

squaring each of the plurality of summed signals;

squaring each of the plurality of differenced signals; and differencing each squared summed signal and each corresponding squared differenced signal so as to form a corresponding plurality of clock signals each having twice the common frequency and a common phase.

22. An apparatus for distributing common phase clock signals, the apparatus comprising:

a transmission line;

a signal generator connected to the transmission line for applying a forward traveling wave sinusoidal signal thereto;

a reflecting load connected to the transmission line for reflecting the applied forward traveling wave sinusoidal signal so as to create a reverse traveling wave sinusoidal signal on the transmission line, the forward traveling wave sinusoidal signal and the reverse traveling wave sinusoidal signal having a common frequency and a constant relative phase;

a plurality of taps disposed proximate to the transmission line for tapping the forward traveling wave sinusoidal signal and the reverse traveling wave sinusoidal signal off the transmission line at a corresponding plurality of different locations along the transmission line, wherein at least one of the plurality of taps is a non-contact coupler;

a plurality of adders for summing the forward traveling wave sinusoidal signal and the reverse traveling wave sinusoidal signal tapped from the transmission line at each of the plurality of different locations so as to provide a plurality of summed signals;

a first plurality of differencers for differencing the forward traveling wave sinusoidal signal and the reverse traveling wave sinusoidal signal tapped from the transmission line at each of the plurality of different locations so as to provide a plurality of differenced signals;

a first plurality of squaring circuits for squaring each of the plurality of summed signals;

a second plurality of squaring circuits for squaring each of the plurality of differenced signals; and a second plurality of differencers for differencing each squared summed signal and each corresponding squared differenced signal so as to form a corresponding plurality of clock signals each having twice the common frequency and a common phase.

23. A method for distributing common phase clock signals, the method comprising the step of:

providing a first sinusoidal signal on a first transmission line and a second sinusoidal signal on a second transmission line, the first sinusoidal signal and the second sinusoidal signal each having a common frequency and a constant relative phase;

tapping the first sinusoidal signal off the first transmission line and the second sinusoidal signal off the second transmission line at a plurality of corresponding locations by non-contact coupling the first sinusoidal signal from the first transmission line and non-contact coupling the second sinusoidal signal from the second transmission line; and multiplying the first sinusoidal signal and the second sinusoidal signal tapped off the first transmission line and the second transmission line, respectively, at each of the plurality of corresponding locations so as to form a corresponding plurality of clock signals each having twice the common frequency and a common phase.

24. A method for distributing common phase clock signals, the method comprising the step of:

providing a first sinusoidal signal on a first transmission line and a second sinusoidal signal on a second transmission line, the first sinusoidal signal and the second sinusoidal signal each having a common frequency and a constant relative phase;

tapping the first sinusoidal signal off the first transmission line and the second sinusoidal signal off the second transmission line at a plurality of corresponding locations by non-contact coupling the first sinusoidal signal from the first transmission line and non-contact coupling the second sinusoidal signal from the second transmission line;

squaring the first sinusoidal signal and the second sinusoidal signal tapped from the first transmission line and the second transmission line, respectively, at each of the plurality of corresponding locations; and differencing each squared first sinusoidal signal and each corresponding squared second sinusoidal signal so as to form a corresponding plurality of clock signals each having twice the common frequency and a common phase.

25. A method for distributing common phase clock signals, the method comprising the step of:

providing a first sinusoidal signal on a first transmission line and a second sinusoidal signal on a second transmission line, the first sinusoidal signal and the second sinusoidal signal each having a common frequency and a constant relative phase;

tapping the first sinusoidal signal off the first transmission line and the second sinusoidal signal off the second transmission line at a plurality of corresponding locations by non-contact coupling the first sinusoidal signal from the first transmission line and non-contact coupling the second sinusoidal signal from the second transmission line;

summing the first sinusoidal signal and the second sinusoidal signal tapped from the first transmission line and the second transmission line, respectively, at each of the plurality of corresponding locations so as to provide a plurality of summed signals;

differencing the first sinusoidal signal and the second sinusoidal signal tapped from the first transmission line and the second transmission line, respectively, at each of the plurality of corresponding locations so as to provide a plurality of differenced signals;

squaring each of the plurality of summed signals;

squaring each of the plurality of differenced signals; and differencing each squared summed signal and each corresponding squared differenced signal so as to form a corresponding plurality of clock signals each having twice the common frequency and a common phase.

26. An apparatus for distributing common phase clock signals, the apparatus comprising:

a first signal generator for generating a first sinusoidal signal;

a second signal generator for generating a second sinusoidal signal, the first sinusoidal signal and the second sinusoidal signal each having a common frequency and a constant relative phase;

a first transmission line for carrying the first sinusoidal signal;

a second transmission line for carrying the second sinusoidal signal;

a first non-contact coupler for non-contact coupling the first sinusoidal signal from the first transmission line at a first plurality of locations;

a second non-contact coupler for non-contact coupling the second sinusoidal signal from the second transmission line at a second plurality of locations, the second plurality of locations corresponding to the first plurality of locations; and a plurality of combiners for combining the first sinusoidal signal coupled from the first transmission line at the first plurality of locations and the second sinusoidal signal coupled from the second transmission line at the second plurality of locations so as to form a corresponding plurality of clock signals each having a common phase.

27. An apparatus for distributing common phase clock signals, the apparatus comprising:

a first signal generator for generating a first sinusoidal signal;

a second signal generator for generating a second sinusoidal signal, the first sinusoidal signal and the second sinusoidal signal each having a common frequency and a constant relative phase;

a first transmission line for carrying the first sinusoidal signal;

a second transmission line for carrying the second sinusoidal signal;

a plurality of taps for tapping the first sinusoidal signal off the first transmission line and the second sinusoidal signal off the second transmission line at a plurality of corresponding locations, wherein at least one of the plurality of taps is a non-contact coupler; and a plurality of combiners for combining the first sinusoidal signal and the second sinusoidal signal tapped off the first transmission line and the second transmission line, respectively, at each of the plurality of corresponding locations so as to form a corresponding plurality of clock signals each having a common phase.

28. An apparatus for distributing common phase clock signals, the apparatus comprising:

a first signal generator for generating a first sinusoidal signal;

a second signal generator for generating a second sinusoidal signal, the first sinusoidal signal and the second sinusoidal signal each having a common frequency and a constant relative phase;

a first transmission line for carrying the first sinusoidal signal;

a second transmission line for carrying the second sinusoidal signal;

a plurality of taps for tapping the first sinusoidal signal off the first transmission line and the second sinusoidal signal off the second transmission line at a plurality of corresponding locations; and a plurality of multipliers for multiplying the first sinusoidal signal and the second sinusoidal signal tapped off the first transmission line and the second transmission line, respectively, at each of the plurality of corresponding locations so as to form a corresponding plurality of clock signals each having twice the common frequency and a common phase.

29. An apparatus for distributing common phase clock signals, the apparatus comprising:

a first signal generator for generating a first sinusoidal signal;

a second signal generator for generating a second sinusoidal signal, the first sinusoidal signal and the second sinusoidal signal each having a common frequency and a constant relative phase;

a first transmission line for carrying the first sinusoidal signal;

a second transmission line for carrying the second sinusoidal signal;

a plurality of taps for tapping the first sinusoidal signal off the first transmission line and the second sinusoidal signal off the second transmission line at a plurality of corresponding locations;

a plurality of squaring circuits for squaring the first sinusoidal signal and the second sinusoidal signal tapped from the first transmission line and the second transmission line, respectively, at each of the plurality of corresponding locations; and a plurality of differencers for differencing each squared first sinusoidal signal and each corresponding squared second sinusoidal signal so as to form a corresponding plurality of clock signals each having twice the common frequency and a common phase.

30. An apparatus for distributing common phase clock signals, the apparatus comprising:

a first signal generator for generating a first sinusoidal signal;

a second signal generator for generating a second sinusoidal signal, the first sinusoidal signal and the second sinusoidal signal each having a common frequency and a constant relative phase;

a first transmission line for carrying the first sinusoidal signal;

a second transmission line for carrying the second sinusoidal signal;

a plurality of taps for tapping the first sinusoidal signal off the first transmission line and the second sinusoidal signal off the second transmission line at a plurality of corresponding locations;

a plurality of adders for summing the first sinusoidal signal and the second sinusoidal signal tapped from the first transmission line and the second transmission line, respectively, at each of the plurality of corresponding locations so as to provide a plurality of summed signals;

a first plurality of differencers for differencing the first sinusoidal signal and the second sinusoidal signal tapped from the first transmission line and the second transmission line, respectively, at each of the plurality of corresponding locations so as to provide a plurality of differenced signals;

a first plurality of squaring circuits for squaring each of the plurality of summed signals;

a second plurality of squaring circuits for squaring each of the plurality of differenced signals; and a second plurality of differencers for differencing each squared summed signal and each corresponding squared differenced signal so as to form a corresponding plurality of clock signals each having twice the common frequency and a common phase.

* * * * *